United States Patent Office 3,845,128
Patented Oct. 29, 1974

3,845,128
PREPARATION OF o-ISOPROPYLAMINO-
BENZOPHENONES
Max Denzer, Lake Parsippany, N.J., and Hans Ott, Pfeffingen, Basel-Land, Switzerland, assignors to Sandoz-Wander, Inc., Hanover, N.J.
No Drawing. Continuation-in-part of abandoned application Ser. No. 679,201, Oct. 30, 1967. This application Aug. 5, 1970, Ser. No. 61,453
Int. Cl. C07c 97/10
U.S. Cl. 260—570 AB        6 Claims

ABSTRACT OF THE DISCLOSURE

Preparation of o-alkylaminobenzophenones by reaction of an o-aminobenzophenone with an alkyl halide, the o-alkylaminobenzophenones being intermediates for the preparation of the corresponding 2(1H)-quinazolinones.

---

This application is a continuation-in-part of our prior application Ser. No. 679,201, filed Oct. 30, 1967, now abandoned.

This invention relates to a process for the preparation of an o-substituted aminobenzophenone. In particular, the invention pertains to a process for preparing an o-isopropylaminobenzophenone as illustrated by the following reaction scheme:

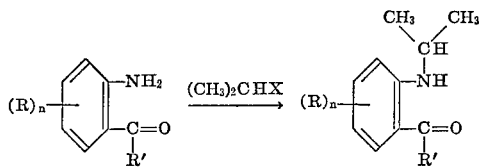

wherein

X represents bromo or iodo;
R represents halo, preferably having an atomic weight no greater than 80, i.e., fluoro, bromo and chloro; lower alkyl, preferably having from 1 to 4 carbon atoms, e.g., methyl, ethyl, propyl or butyl; lower alkoxy, preferably containing from 1 to 4 carbon atoms, e.g., methoxy, ethoxy, propoxy or butoxy; nitro; or trifluoromethyl;
n represents 0, 1 or 2; provided that when n is 2 each R is the same and either lower alkyl or lower alkoxy;
R' represents phenyl; or substituted phenyl of the formula

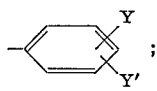

Y represents halo of atomic weight not greater than 80; hydroxy, lower alkyl, preferably containing from 1 to 4 carbon atoms, e.g., methyl, ethyl, propyl or butyl; lower alkoxy, preferably containing from 1 to 4 carbon atoms, e.g., methoxy, ethoxy, propoxy or butoxy; or trifluoromethyl; and
Y' represents hydrogen; halo of atomic weight not greater than 80; hydroxy; lower alkyl, preferably containing from 1 to 4 carbon atoms, e.g., methyl, ethyl, propyl or butyl; or lower alkoxy, preferably containing from 1 to 4 carbon atoms, e.g., methoxy, ethoxy, propoxy or butoxy.

The preparation of o-alkylaminobenzophenones has heretofore been accomplished by first tosylating o-aminobenzophenone, alkylating the resulting tosylated intermediate and then removing the protecting tosyl group by hydrolysis. While this process is suitable for preparing o-alkylaminobenzophenone wherein the alkyl moiety is a straight chain alkyl, it is not particularly suitable for the preparation of those compounds wherein the alkyl moiety is a branched chain and the branching occurs on the carbon atom directly attached to the ring nitrogen atom in that there is a significant reduction in the yield of the desired product due to steric hinderance.

In accordance with the present invention, there is now provided a process whereby an o-isopropylaminobenzophenone is obtained with facility in one step and in excellent yields. As indicated hereinabove, the process of the present invention involves reacting an o-aminobenzophenone with isopropyl bromide or isopropyl iodide, preferably the latter. Desirably, the reaction is carried out in the presence of an acid binding agent to take up the hydrogen halide liberated during the reaction. Any of the several acid binding agents of known type may be employed including the inorganic bases such as the alkali metal carbonates, e.g., sodium carbonate, potassium carbonate and lithium carbonate, and the organic bases such as the tertiary amines, e.g., triethylamine. The preferred acid binding agents are the alkali metal carbonates, more preferably sodium carbonate or potassium carbonate. The reaction is desirably carried out with a stoichiometric excess of at least about 25% of the isopropyl halide, preferably a 50% to 500% stoichiometric excess. If desired, the reaction may be carried out in any suitable inert organic solvent, e.g., dioxane, benzene and toluene. However, the use of a solvent is not necessary since an excess of the isopropyl halide can be utilized for this purpose. The reaction is most conveniently effected at elevated temperatures. Desirably, the reaction is carried out at a temperature of at least about 60° C., usually 60° C. to 100° C. Preferably, the reaction is conducted at the reflux temperature of the system. However, the particular temperature employed is not particularly critical and somewhat lower or higher temperatures and/or elevated pressures can be employed. A feature of the process of the invention is that it results in the production of a reaction product which consists essentially of the desired o-monoisopropylaminobenzophenone to the substantial exclusion of diisopropylated by-products, i.e., the reaction product contains no more than about 3% of diisopropylated material, and more typically the reaction product contains only a trace or no amounts of diisopropylated by-product. Accordingly, the process enables the production of o-monoisopropylaminobenzophenones in high yields of the order of at least about 70%, and yields of typically 80% to 95% may be readily and efficiently obtained with the process of the invention. Reaction times may vary over a fairly wide range depending upon known factors such as reaction temperature and starting materials employed in the reaction. High conversions of the o-aminobenzophenone starting material of at least about 70-75% and high yields of at least about 70% of the desired o-monoisopropylaminobenzophenone may be obtained in as little as 10 hours, with higher yields of the order of 80-95% of the desired product usually obtained when the reaction is conducted over a period of about 20 to 120 hours. The production of the desired o-isopropylaminobenzophenone in high yield and to the substantial exclusion of diisopropylated by-product by the process of the invention is unexpected and surprising, particularly in view of the fact that such results are obtained despite the use of substantial excess amounts of the isopropyl halide.

It should be noted that the reaction proceeds independently of the particular substituents attached to the phenyl rings. Accordingly, while the process of the invention is specifically exemplified with respect to certain substituents attached to either or both of the phenyl rings, it nevertheless can be utilized for the preparation of all of the compounds included within the scope of the invention.

The compounds of formula II prepared in accordance with this invention are useful as intermediates for the preparation of the corresponding 1-isopropyl-4-aryl- 2(1H)-quinazolinones in accordance with the following reaction scheme:

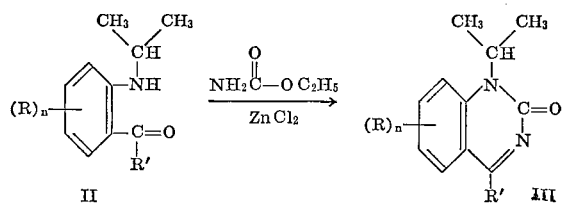

wherein R, R' and n are as previously defined.

In accordance with the above process, an o-isopropylaminobenzophenone (II) is reacted with ethyl carbamate in the presence of a catalytic amount of a Lewis acid, e.g., zinc chloride, and at elevated temperatures. Preferably, the reaction is effected at a temperature of from about 160° C. to about 200° C. If desired, the reaction may be carried out in the presence of a suitable inert organic solvent. However, the use of a solvent is not necessary since an excess of the carbamate can be used for this purpose.

Various of the o-aminobenzophenones (I) employed as starting materials in the process of this invention are known and can be prepared as described in the literature. Such others which may not be specifically described in the literature can be readily prepared from available materials in analogous manner.

The quinazolinones (III) obtained from the compounds produced in accordance with the process of this invention are useful because they possess pharmacological activity in animals. In particular, such compounds are useful as anti-inflammatory agents as indicated by the carrageenin-induced edema test on rats, and the antagonism of bradykinin-induced broncho-constriction of the guinea pig. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compound used and mode of administration. However, in general, satisfactory results are obtained when administered at a daily dosage of from about 2 milligrams to about 20 milligrams per kilogram of body weight, preferably given in divided doses 2 to 4 times a day, or in sustained release form. For most mammals, the administration of from about 150 milligrams to about 600 milligrams of the compound per day provides satisfactory results and dosage forms suitable for internal administration comprise from about 37.5 milligrams to about 300 milligrams of the compound in admixture with a solid or liquid pharmaceutical carrier or diluent. A representative formulation is a tablet prepared by conventional tabletting techniques and containing, by weight, 50 parts of 1-isopropyl-4-phenyl-2(1H)-quinazolinone, 2 parts of tragacanth, 39.5 parts of lactose, 5 parts of corn starch, 3 parts of talcum and 0.5 parts of magnesium stearate.

The following examples illustrate the preparation of representative compounds utilizing the process of this invention. However, it is to be understood that the examples are for purposes of illustration only and are not intended as in any way limiting the scope of the invention which is defined in the appended claims.

EXAMPLE 1 o-Isopropylaminobenzophenone

A mixture of 20 g. of o-aminobenzophenone, 10 g. of sodium carbonate and 50 ml. of isopropyl iodide is refluxed with stirring for 5 days. The excess isopropyl iodide is then evaporated off in vacuo, and the resulting residue extracted with 200 ml. of benzene. The benzene extract is then filtered, washed twice with 100 ml. (each) of water, dried over anhydrous sodium sulfate, filtered and evaporated to dryness in vacuo to obtain o-isopropylaminobenzophenone as an oil.

EXAMPLE 2

5-chloro-2-isopropylaminobenzophenone

A mixture of 10 g. of 5-chloro-2-aminobenzophenone, 5 g. of sodium carbonate and 30 ml. of isopropyl iodide is refluxed with stirring for 2½ days. The excess isopropyl iodide is then evaporated off in vacuo and the resulting residue extracted with 200 ml. of benzene. The benzene extract is then filtered, washed twice with 100 ml. (each) of water, dried over anhydrous sodium sulfate, filtered and evaporated to dryness in vacuo to obtain 5-chloro-2-isoproplyaminobenzophenone as an oil.

EXAMPLE 3

2-isopropylamino-4'-methylbenzophenone

A mixture of 5 g. of 2-amino-4'-methylbenzophenone, 5 g. of sodium carbonate and 20 ml. of isopropyl iodide is refluxed with stirring for 5 days. The excess isopropyl iodide is then evaporated off in vacuo and the resulting residue extracted with 200 ml. of benzene. The benzene extract is then filtered, washed twice with 100 ml. (each) of water, dried over anhydrous sodium sulfate, filtered and evaporated to dryness in vacuo to obtain 2-isopropylamino-4'-methylbenzophenone as an oil.

EXAMPLE 4

4,5-dimethyl-2-isopropylaminobenzophenone

A mixture of 9.5 g. of 2-amino-4,5-dimethylbenzophenone, 5 g. of sodium carbonate and 30 ml. of isopropyl iodide is refluxed with stirring for 20 hours. The excess isopropyl iodide is then evaporated off in vacuo and the resulting residue extracted with 200 ml. of benzene. The benzene extract is then filtered, washed twice with 100 ml. (each) of water, dried over anhydrous sodium sulfate, filtered and evaporated to dryness in vacuo to obtain 4,5-dimethyl-2-isopropylaminobenzophenone as an oil which is further purified chromatographically on an aluminum oxide column.

EXAMPLE 5

2-isopropylamino-5-trifluoromethylbenzophenone

A mixture of 25 g. of 2-amino-5-trifluoromethylbenzophenone, 15 g. of sodium carbonate and 100 ml. of isopropyl iodide is refluxed with stirring for 4 days. The excess isopropyl iodide is then evaporated off in vacuo and the resulting residue extracted with 200 ml. of benzene. The benzene extract is then filtered, washed twice with 100 ml. (each) of water, dried over anhydrous sodium sulphate, filtered and evaporated to dryness in vacuo to obtain 2-isopropylamino-5-trifluoromethylbenzophenone as an oil. The oil is crystallized from cold ethanol to obtain product; m.p. 68°–70° C.

EXAMPLE 6

1-isopropyl-4-phenyl-2(1H)-quinazolinone

A mixture of 21 g. of crude o-isopropylaminobenzophenone, 40 g. of urethane and 1.5 g. of zinc chloride is heated for 4 hours at 180–200° C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhydrous sodium sulfate and evaporated in vacuo. The residue is crystallised from ethyl acetate to obtain 1-isopropyl-4-phenyl-2(1H)-quinazolinone, m.p. 140° C.

What is claimed is:
1. A process for preparing a compound of the formula:

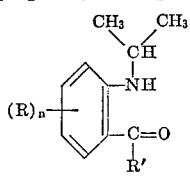

wherein

R represents halo, lower alkyl, lower alkoxy, nitro or trifluoromethyl;

n represents 0, 1 or 2; provided that when n is 2 R is either lower alkyl or lower alkoxy;

R' represents phenyl or substituted phenyl of the formula

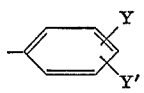

Y represents halo, hydroxy, lower alkyl, lower alkoxy or trifluoromethyl; and

Y' represents hydrogen, halo, hydroxy, lower alkyl or lower alkoxy;

which consists essentially of reacting a compound of the formula

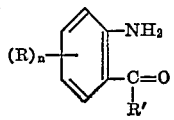

wherein R, R' and n are as defined above, with at least a 25% stoichiometric excess of an isopropyl halide selected from the group consisting of isopropyl bromide or isopropyl iodide, at an elevated temperature of at least about 60° C. for a time of at least 10 hours, and isolating the resulting reaction product consisting essentially of an o-monoisopropylaminobenzophenone in yield of at least 70% based on the starting o-aminobenzophenone.

2. A process of claim 1 wherein the reaction is carried out in the presence of an acid binding agent.

3. A process of claim 1 wherein the reaction is carried out at a temperature in the range of from about 60° to 100° and in the presence of an alkali metal carbonate as acid binding agent.

4. A process of claim 3 wherein the temperature is the reflux temperature of the system.

5. A process of claim 2 wherein isopropyl iodide is employed.

6. A process of claim 3 wherein isopropyl iodide is employed.

References Cited
UNITED STATES PATENTS 3,005,026  10/1961  Gordon _____ 260—577
3,121,077  2/1964  Keller et al. _____ 260—239.3

ROBERT V. HINES, Primary Examiner

U.S. Cl. X.R.

260—251 QB; 424—251